(12) United States Patent
Reich

(10) Patent No.: US 6,173,091 B1
(45) Date of Patent: Jan. 9, 2001

(54) FIBER OPTIC FABRY-PEROT SENSOR FOR MEASURING ABSOLUTE STRAIN

(75) Inventor: Stanley M. Reich, Jericho, NY (US)

(73) Assignee: Northrop Grumman Corporation, Los Angeles, CA (US)

( * ) Notice: Under 35 U.S.C. 154(b), the term of this patent shall be extended for 0 days.

(21) Appl. No.: 09/482,446

(22) Filed: Jan. 11, 2000

Related U.S. Application Data

(62) Division of application No. 08/971,629, filed on Nov. 17, 1997, now Pat. No. 6,057,911.

(51) Int. Cl.[7] ..................................................... G01L 1/24
(52) U.S. Cl. .................. 385/12; 250/227.28; 356/33; 356/35.5; 356/351; 356/352
(58) Field of Search ................................. 385/12, 13, 15, 385/27, 39; 250/227.14, 227.17, 227.18, 227.19, 227.24, 227.27, 227.28; 356/32–34, 35.5, 345, 351, 352

(56) References Cited

U.S. PATENT DOCUMENTS

| | | |
|---|---|---|
| 4,773,753 | 9/1988 | Hirose et al. . |
| 4,777,358 | 10/1988 | Nelson . |
| 4,840,481 | 6/1989 | Spillman, Jr. . |
| 4,842,403 | 6/1989 | Tarbox et al. . |
| 4,928,004 | 5/1990 | Zimmermann et al. . |
| 4,958,929 | 9/1990 | Kondo . |
| 5,094,527 | 3/1992 | Martin . |
| 5,187,983 | 2/1993 | Bock et al. . |
| 5,301,001 | * 4/1994 | Murphy et al. ....................... 356/35.5 |
| 5,359,405 | * 10/1994 | Andrews ........................... 356/35.5 |
| 5,367,583 | * 11/1994 | Sirkis ...................................... 385/12 |
| 5,392,117 | 2/1995 | Belleville et al. . |
| 5,397,891 | * 3/1995 | Udd et al. ......................... 250/227.18 |
| 5,399,854 | 3/1995 | Dunphy et al. . |
| 5,591,965 | * 1/1997 | Udd ................................. 250/227.18 |
| 5,963,034 | * 10/1999 | Mahapatra et al. .......... 250/227.14 X |
| 6,057,911 | * 5/2000 | Reich ................................... 356/35.5 |

* cited by examiner

*Primary Examiner*—John D. Lee
(74) *Attorney, Agent, or Firm*—Terry J. Anderson; Karl J. Hoch, Jr.

(57) ABSTRACT

Absolute strain is measured by providing a coherent beam of light and separating the coherent beam of light into first and second beams which are in quadrature with one another and which have different polarization angles. The first and second beams are combined in a manner which maintains the different polarization angles thereof, so as to form a combined beam. The combined beam is then applied to a Fabry-Perot strain sensor so as to form a reflected combined beam. The reflected combined beam is then separated into first and second reflected beams having different polarization angles. The intensity of the first and second reflected beams is then sensed, so as to determine a change in the etalon length of the Fabry-Perot sensor. The change in etalon length is indicative of the absolute strain sensed.

4 Claims, 4 Drawing Sheets

FIBER OPTIC FABRY-PEROT SENSOR FOR MEASURING ABSOLUTE STRAIN

This application is a division of application Ser. No. 08/971,629, filed Nov. 17, 1997, now U.S. Pat. No. 6,057,911.

FIELD OF THE INVENTION

This invention relates generally to optical strain gauges and more particularly to a fiber optic Fabry-Perot sensor specifically configured to measure both the magnitude and direction of strain applied thereto.

BACKGROUND OF THE INVENTION

Strain gauges for measuring strain in various different structures and materials are well known. Such strain gauges typically utilize various different types of transducers in which a change in resistance or capacitance is indicative of a corresponding change in strain.

Although such electrical strain gauges are generally suitable for measuring strain, those skilled in the art will appreciate that such electrical transducers are not suitable for use in some particular applications. For example, it is generally not desirable to utilize electrical transducers in explosive environments, where it is possible that an electrical spark may initiate an undesirable explosive reaction. Further, in some applications the presence of electricity may undesirably interfere with sensitive electronic equipment and the like. Further, in some applications ambient electrical fields may undesirably effect the performance of such electrical transducers. Further, the electricity associated with such electrical transducers may cause the undesirable generation of heat.

Optical strain sensors are known for eliminating such undesirable characteristics of electrical strain gauges. Such optical strain sensors typically comprise Fabry-Perot interferometers wherein the cavity thereof is disposed along the length of an optical fiber which may either be attached to or embedded within a material or structure for which strain measurement is desired.

However, one problem commonly associated with the use of simple Fabry-Perot optical strain sensors is that no indication of the direction of the strain, i.e., compressive or tensile, is indicated thereby. Contemporary simple Fabry-Perot optical strain sensors provide only an indication of the magnitude of the strain applied thereto and do not provide any indication of absolute strain. As used herein, the term absolute strain indicates a strain measurement with which a direction is associated. Thus, a measurement of absolute strain provides both the magnitude of the strain and an indication as to whether the strain is compressive or tensile in nature.

In an effort to provide a measurement of absolute strain, various different prior art devices have been developed. Such prior art devices utilized dual Fabry-Perot interferometers wherein the signal output of each of the interferometers are in quadrature with one another. Thus, an indication of whether the etalon is decreasing or increasing in length is provided as the Fabry-Perot interferometer experiences either compression or tension. One example of such a prior art dual interferometer strain sensor is provided in U.S. Pat. No. 5,301,001, issued on Apr. 5, 1994 to Murphy et al and entitled EXTRINSIC FIBER OPTIC DISPLACEMENT SENSORS AND DISPLACEMENT SENSING SYSTEMS.

However, as those skilled in the art will appreciate, prior art devices which facilitate the measurement of absolute strain are comparatively complex. Two separate fiber optic signal cables are required. Additionally, two separate optical sensors and their related electronics must also be utilized. The complexity of such devices inherently reduces their reliability and also makes them more difficult to use. This is particularly true since two separate optical fibers must be imbedded, mounted, and/or routed. Such prior art dual interferometer strain sensors are also inherently more expensive, due to the increased number of components thereof.

In view of the foregoing, it is desirable to provide a fiber optic strain sensor which measures both the magnitude and direction of strain applied thereto and which is simple in construction, so as to enhance the reliability and ease of use thereof, while also reducing the cost thereof.

SUMMARY OF THE INVENTION

The present invention addresses and alleviates the above-mentioned deficiencies associated with the prior art. More particularly, the present invention comprises a method and apparatus for measuring absolute strain. The fiber optic strain sensor of the present invention utilizes a single Fabry-Perot interferometer to provide a measurement of absolute strain. Thus the present invention does not require the use of plural optical fibers, and consequently is less expensive, more reliable, and easier to install and use than contemporary devices.

The method of the present invention comprises the steps of providing a coherent beam of light, separating the coherent beam of light into first and second beams having different polarization angles, combining the first and second beams in a manner which maintains the differing polarizations thereof so as to form a combined beam, applying the combined beam to a Fabry-Perot strain sensor to form a reflected combined beam, and then separating the reflected combined beam into first and second reflected beams having different polarization angles. The intensity of each of the first and second reflected beams is sensed and a determination of the change in etalon length of the Fabry-Perot strain sensor is thus determined from the sensed intensities. Thus, according to the present invention, the change in etalon length is indicative of absolute strain.

The coherent beam of light is preferably provided via a laser, preferably a laser providing a polarized light output. If the output of the laser is not adequately polarized, then the coherent beam of light is polarized prior to being separated into first and second beams.

The coherent beam of light is separated into first and second beams having different polarization angles by separating the coherent beam of light into first and second beams and then rotating the polarization angle of the second beam relative to the first beam. The phase of one of the beams is delayed by 90°, so as to place the two beams in quadrature with one another.

The first and second beams are then combined into a single beam in a manner which maintains the respective polarizations thereof. Thus, the combined beam comprises two orthogonally polarized light beams which are in quadrature with one another.

The combined beam is applied to the Fabry-Perot strain sensor via a polarization maintaining fiber, so as to prevent undesirable interaction of the first and second orthogonally polarized beams thereof.

The first beam of the combined beams is polarized along either the fast or slow axis of the polarization maintaining fiber and the second beam is polarized along the other axis thereof. In this manner, two separate coherent laser beams are effectively provided so as to facilitate the measurement of absolute strain with the present invention.

The first and second reflected beams are in quadrature, i.e., 90 degrees out of phase with respect to one another, regardless of the length of the etalon of the Fabry-Perot interferometer. As those skilled in the art will appreciate, it is possible to determine the direction of strain, i.e., compression or tensile, from the two return signals from the Fabry-Perot interferometer. A detailed explanation of the methodology utilized to determine the direction of strain is provided in U.S. Pat. No. 5,301,001, issued on Apr. 5, 1994 to Murphy et al, the contents of which are hereby incorporated by reference.

These, as well as other advantages of the present invention, will be more apparent from the following descriptions and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiments of the invention, and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit and scope of the invention.

Figure 1A:
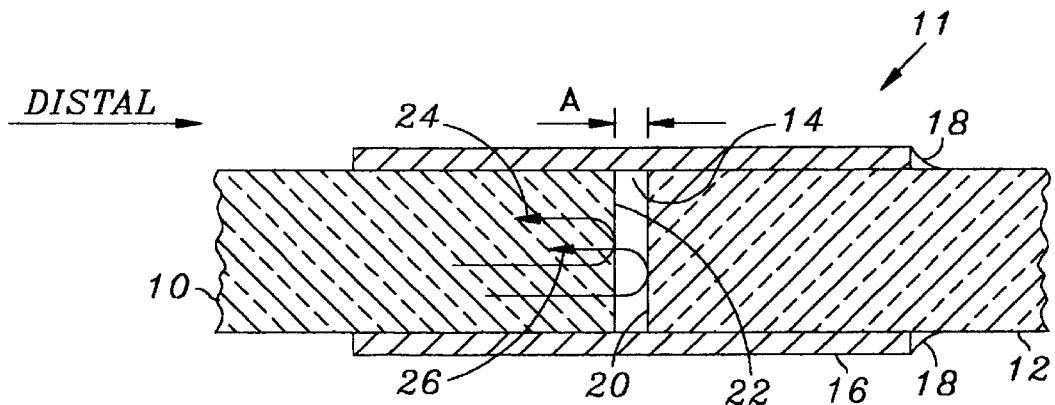
FIG. 1a is a cross-sectional side view of a contemporary Fabry-Perot strain sensor which is not capable of measuring absolute strain.
Figure 1B:
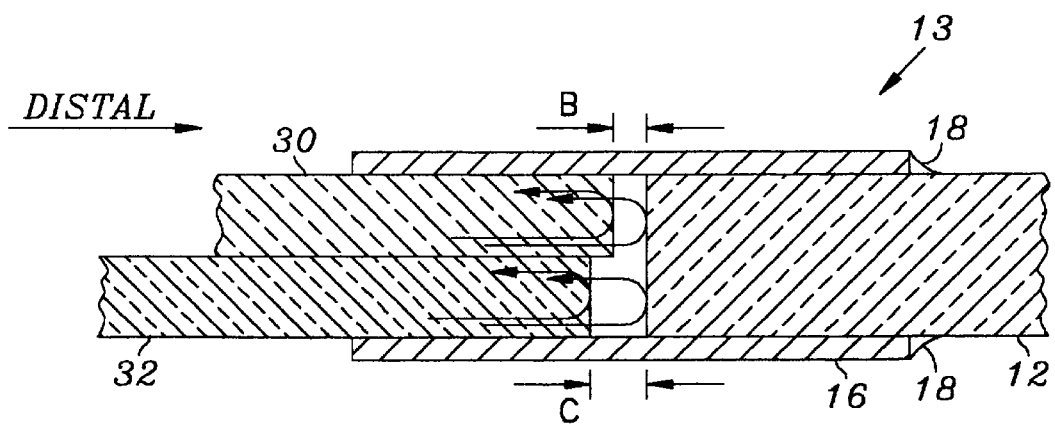
FIG. 1b is a cross-sectional side view of a contemporary Fabry-Perot strain sensor which utilizes two separate single mode optical fibers so as to facilitate the measurement of absolute strain therewith.

The fiber optic Fabry-Perot sensor of the present invention is illustrated in FIGS. 2–5b, which depict two presently preferred embodiments of the present invention. FIGS. 1a and 1b illustrate prior art fiber optic Fabry-Perot sensors.

Referring now to FIG. 1, a contemporary fiber optic Fabry-Perot sensor 11 comprises a first optical fiber 10, typically a single mode fiber, and a second optical fiber 12, typically a multi-mode optical fiber. The first 10 and second 12 optical fibers are arranged such that they nearly abut, end to end, so as to form a gap or etalon 14 having a dimension A representing the distance between the two optical fibers 10 and 12. A sheath 16 is typically attached to one of the optical fibers 10 and 12, preferably the second or multi-mode optical fiber 12, preferably via welds or adhesive 18 in a manner which facilitates longitudinal movement of the two optical fibers 10 and 12 relative to one another, so as to vary dimension A of the etalon 14. Thus, according to such construction, the second optical fiber 12 remains fixed with respect to the sheath 16 while the first optical fiber 10 is free to slide with respect thereto. The end 20 of the second optical fiber 12 is typically mirrored so as to enhance the reflectivity thereof. The end 22 of the first optical fiber 10 may be partially mirrored, as desired, so as to enhance the reflectivity thereof.

As those skilled in the art will appreciate, the first 10 and second 12 optical fibers thus define a Fabry-Perot interferometer wherein coherent light traveling distally reflects from the end 22 of the first optical fiber 10 as indicated by arrow 24 and is also transmitted through the end 22 of the first optical fiber such that it is subsequently reflected by the mirrored end 20 of the second optical fiber 12, as indicated by arrow 26. The coherent light indicated by arrow 24 and the coherent light indicated by arrow 26 interfere with one another according to well known physical principles so as to form interference bands or fringes which are easily detectible via a photodetector or the like.

As the length of the etalon 14, dimension A, varies, a series of such fringes are detected by the photodetector and may be counted so as to provide an indication of the change in dimension A of the etalon 14. Because of the small wavelength of light, the counting of interference fringes provides an accurate determination of very small distances.

The use of such a fiber optic Fabry-Perot sensor to measure strain is particularly advantageous in those situations where it is not desirable to have an electrical signal. For example, in explosive environments, or in environments wherein such an electrical signal may interfere with sensitive equipment, or be interfered with by external electromagnetic fields, the use of such an optical sensor provides an acceptable solution.

To utilize such a fiber optic Fabry-Perot sensor to measure strain, the etalon 14 containing portion thereof is either mounted to the surface of or disposed within the structural member for which a strain measurement is desired. In many instances, it is desirable to position the sensor 11 within the structural member for which strain measurement is desired, so as to more accurately and reliably obtain strain measurements therefor.

However, one inherent disadvantage of such a contemporary Fabry-Perot sensor is its inability to provide absolute strain measurements. Fringes are generated in the same manner whether dimension A of the etalon 14 increases or decreases, thus not facilitating a determination of whether the sensed strain is compressive or tensile in nature. As those skilled in the art will appreciate, this disadvantage is indeed substantial. In many instances, it is advantageous, if not crucial, that the direction of the strain be known.

Referring now to FIG. 1b, in an attempt to overcome the deficiencies of such contemporary fiber Fabry-Perot sensors a dual signal fiber Fabry-Perot sensor 13 has been developed. The dual signal fiber sensor utilizes two separate signal fibers, as opposed to the single signal fiber sensor discussed above. Thus, two individual single mode optical fibers 30 and 32 are configured so as to provide light beams which are in quadrature, i.e., 90 degrees out of phase with respect to one another. The two signal optical fibers 30 and 32 are fixed in position relative to one another and, as a pair, are longitudinally movable with respect to the multi-mode optical fiber 12.

The use of two separate such signal fibers transmitting two separate light beams which are in quadrature with one another facilitates determination of the direction of etalon movement, thus indicating whether a sensed strain is compressive or tensile in nature, as discussed in detail in U.S. Pat. No. 5,301,001, which was incorporated by reference above.

Figure 2:
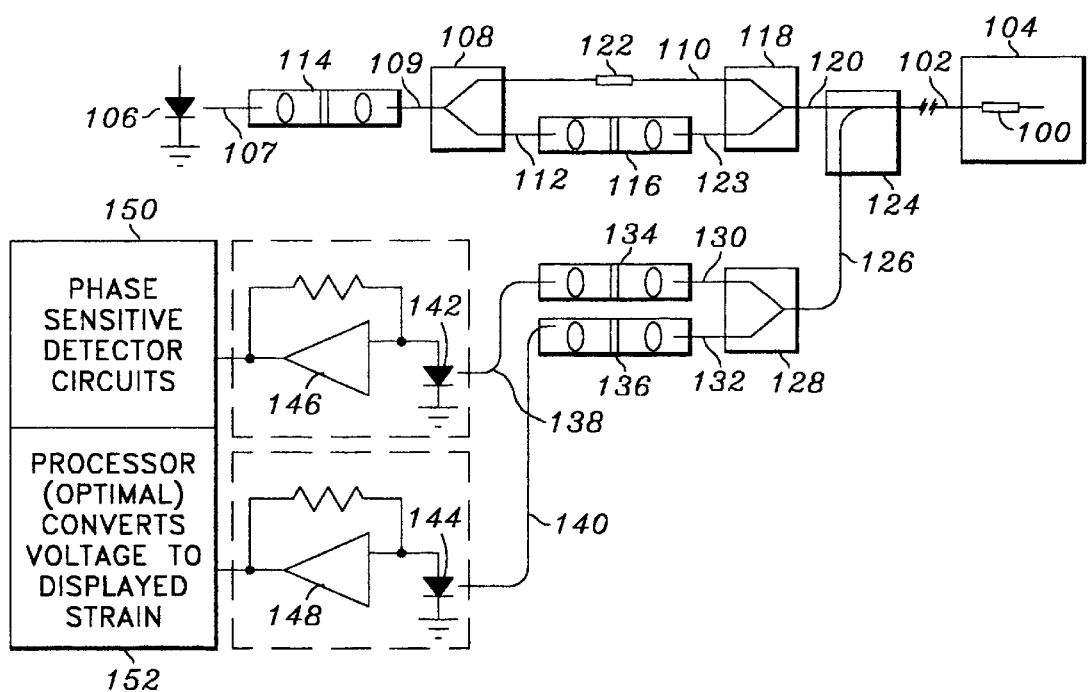
FIG. 2 is a schematic representation of a first embodiment of the fiber optic Fabry-Perot sensor for measuring absolute strain according to the present invention.

Referring now to FIG. 2, according to a first embodiment of the present invention, a single signal fiber Fabry-Perot interferometer 100 is formed generally similar to the prior art device illustrated in FIG. 1a. However, according to the present invention, the signal fiber 102 comprises a single mode polarization maintaining fiber so as to facilitate the simultaneous transmission of two orthogonally polarized non-interfering optical signals therethrough. The two optical signals are configured such that they are in quadrature, 90 degrees apart in phase, with respect to one another, as discussed in detail below. Thus, the direction of strain, i.e., compressive or tensile, can be determined according to the methodology of U.S. Pat. No. 5,301,001. The Fabry-Perot sensor 100 can be disposed within a material 104, such as an epoxy and/or composite material, for example, for which absolute strain measurement is desired.

A substantially coherent light source, preferably a laser such as diode laser 106, provides a coherent beam 107 of light to a polarization maintaining splitter 108 which separates the coherent beam 107 into separate first 110 and second 112 beams.

Optionally, a polarizer 114 is placed intermediate the coherent light source 106 and the polarization maintaining splitter 108, so as to assure proper polarization of the coherent beam 107. As those skilled in the art will appreciate, the coherent light source 106 may optionally provide an output having a sufficient polarization so as to eliminate the need for a separate polarizer.

The second beam 112 is directed through a ½ wave plate 116 which delays the beam so as to place it in quadrature with the first beam 110 and also rotates the polarization of the beam by 90 degrees. Phase maintaining combiner 118 combines the first 110 and second 112 beams to form combined beam 120, while maintaining the desired phase relationship of the first 110 and second 112 beams. Attenuator 122 attentuates the intensity of the first beam 110, so as to make it approximately equal to the intensity of the second beam 112, which has been reduced by the ½ wave plate 116. The combined beam 120 then passes through polarization maintaining directional coupler 124, which functions as a splitter for the returned beam, as discussed in detail below. From the polarization maintaining coupler 124, the combined beam 120 is launched into phase maintaining single mode optical fiber 102 for transmission into the Fabry-Perot sensor 100 disposed within the material 104 for which strain measurement is desired. The combined beam 120 is reflected by the Fabry-Perot sensor 100 and travels back through the polarization maintaining single mode optical fiber 102 to the polarization maintaining directional coupler 124 from which it is split away from the incoming combined beam 120, to form reflected combined beam 126.

Reflected combined beam 126 is then split by polarization maintaining combiner 128 into the two orthogonally polarization components thereof, i.e., first polarized beam 130 and second polarized beam 132. First polarized beam 130 passes through first analyzer collimator assembly 134 and second polarized beam 132 simultaneously passes through second analyzer collimator assembly 136.

The first analyzer collimator assembly 134 provides a first collimated polarized beam 138 to first optical detector 142 and second analyzer collimator assembly 136 provides a second collimated polarized beam 140 to second optical detector 144.

First amplifier circuit 146 amplifies the output of the first optical detector 142 and second amplifier circuit 148 amplifies the output of second optical detector 144.

The outputs of both the first amplifier circuit 146 and the second amplifier circuit 148 are provided to phase sensitive detector circuits 150 and processor 152. The phase sensitive detector circuits 150 determine both the amplitude and direction of the sensed strain, so a to provide absolute strain utilizing the methodology of U.S. Pat. No. 5,301,001. Processor 152 then conditions the sensed signals for display as strain.

Figure 3:
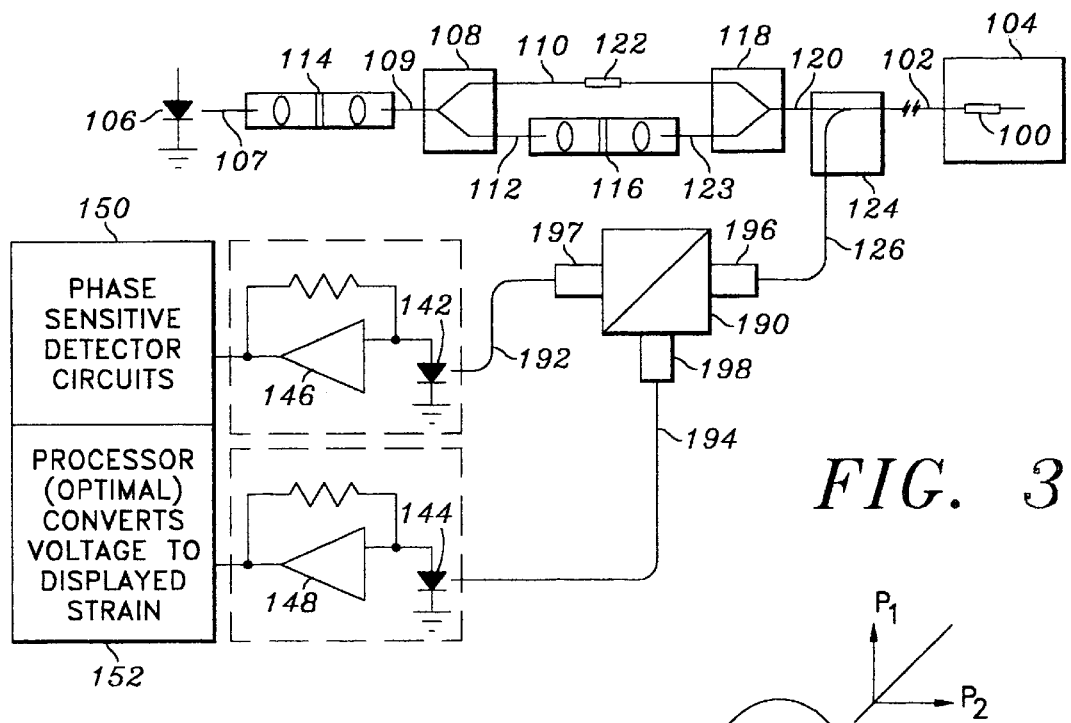
FIG. 3 is a schematic representation of a second embodiment of the fiber optic Fabry-Perot sensor for measuring absolute strain according to the present invention.

Referring now to FIG. 3, in a second embodiment of the present invention, the analyzer collimator assemblies 134 and 136 are replaced with a polarizing beam splitter 190 for separating the combined polarized beams 126 into their separate, orthogonally polarized, component beams 192 and 194. One-quarter pitch GRIN lens beam expander 196 expands the laser beam prior to its being introduced to polarizing beam splitter 190. Beam expanders 197 and 198 then reduce the split orthogonally polarized components, 192 and 194, respectfully, for transmission via first 192 and second 194 optical fibers to optical detectors 142 and 144.

Figure 4:
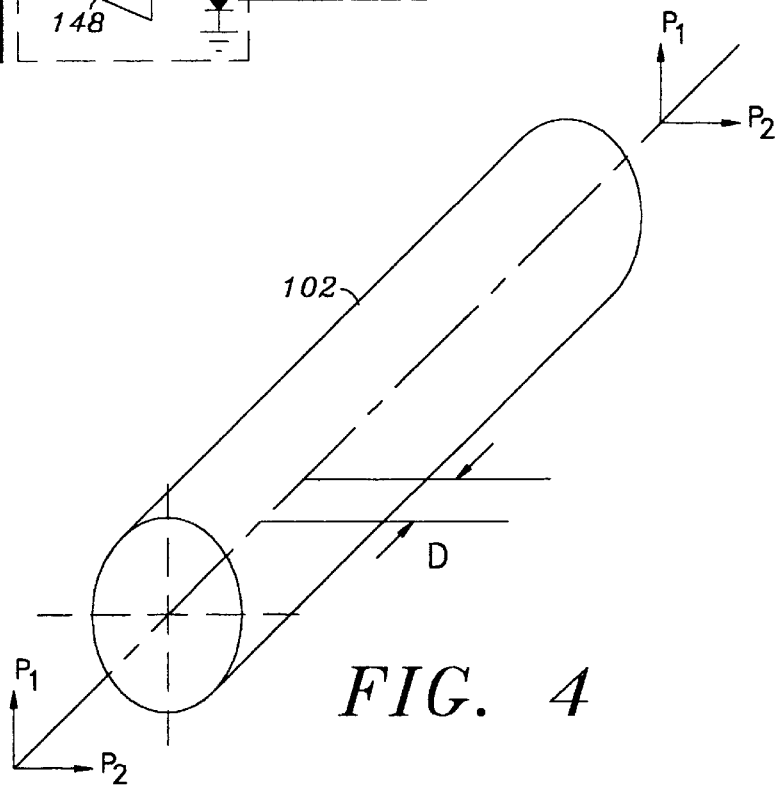
FIG. 4 illustrates the transmission of polarized light along the two different orthogonal axes of a polarization maintaining single mode optical fiber.

With particular reference to FIG. 4, as those skilled in the art will appreciate, the single mode polarization maintaining fiber 102 facilitates the independent and separate transmission of the two orthogonally polarized light beams 110 and 112 (FIGS. 2 and 3) therealong, without interference among one another. The first beam 110, for example, having a first polarization corresponding to axis P1, travels independently through the length of the polarization maintaining optical fiber 102, while the second beam 112, for example, having a polarization along axis P2, travels independently and simultaneously therealong. Dimension D represents the beat length of the simultaneously transmitted beams, which is typically approximately 1 to 3 millimeters.

In both embodiments of the present invention, the two light beams are independently acted upon by the Fabry-Perot interferometer 100, and are thus reflected back through single mode polarization maintaining optical fiber 102 along their original axes of polarization.

Figure 5A:
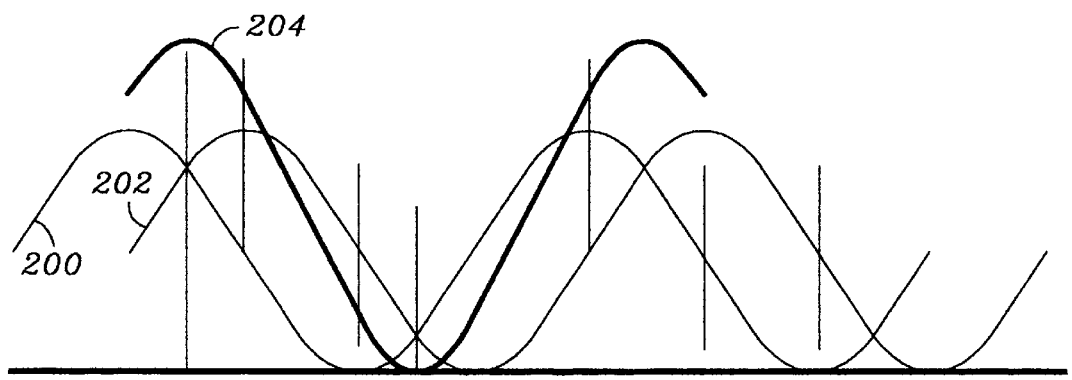
FIG. 5a illustrates the sum of two intensity signals which are in quadrature.

Referring now to FIG. 5a, the addition of two out-of-phase optical signals is illustrated. This is illustrative of the method by which each of the two orthogonally polarized light beams interferes with itself because of the action of the Fabry-Perot interferometer. As those skilled in the art will appreciate, the Fabry-Perot interferometer separates each of the two orthogonally polarized light beams into two components (for a total of four different light beams). The two components of each of the so separated light beams recombine or interfere with one another so as to form a composite light beam according to the principles illustrated in FIG. 5a.

As those skilled in the art will appreciate, when first 200 and second 202 optical signals are added to one another, a resultant 204 signal is generated thereby. Each point on the resultant signal 204 is the algebraic sum of the two corresponding points of the first 200 and second 202 signals. It is important to note that this process occurs simultaneously for each of the two separate orthogonally polarized light beams, thus giving the effect of having two separate Fabry-Perot interferometers, although only one single mode optical fiber and one multi mode optical fiber are utilized to define the single Fabry-Perot interferometer. It is also important to note that the two light beams are in quadrature, i.e., have a 90° phase difference with respect to one another, such that absolute strain can be determined thereby.

The Fabry-Perot fiber optic sensor of the present invention can be configured either as an intrinsic sensor or an extrinsic sensor, as desired. As those skilled in the art will appreciate, in an intrinsic sensor the fiber itself functions as a part of the sensing mechanism, whereas in an extrinsic sensor the fiber merely acts as a conduit for the transmission of light to and from the sensing element. Preferably, the distal end of the multi-mode fiber is shattered or otherwise configured such that it does not define a substantially planar surface, such that reflections from the far end of the multi-mode fiber do not substantially occur and thereby undesirably contribute to the sensor signal. Alternatively, the proximal end of the multi-mode fiber may be mirrored sufficiently such that a substantial quantity of light is not transmitted into the multi-mode fiber.

Figure 5B:
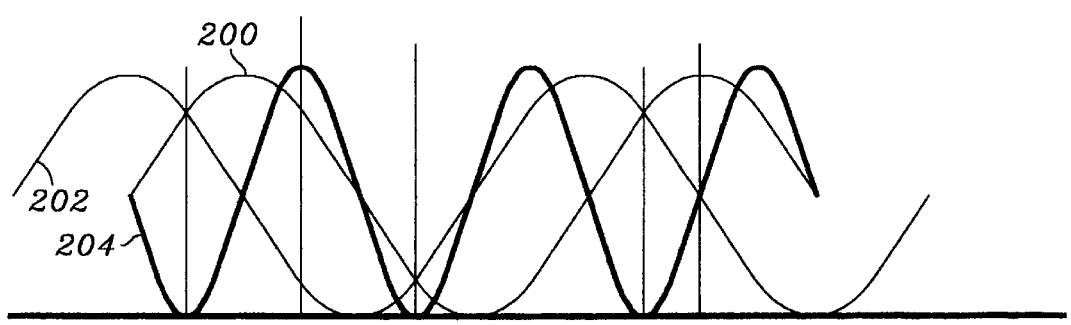
FIG. 5b illustrates the determination of phase via the difference between two intensity signals.

Referring now to FIG. 5b, the subtraction of two light beams so as to provide an indication of the relative phase thereof is illustrated. As those skilled in the art will appreciate, subtracting light beam 202 from light beam 200 yields signal 204, which is indicative of the phase difference between light beam 200 and light beam 202. When the sensed strain changes direction, the relative phases of the quadrature signal reverses, thereby providing an indication of absolute strain.

It is understood that the exemplary fiber optic Fabry-Perot sensors described herein and shown in the drawings represent only preferred embodiments of the invention. Indeed, various modifications and additions may be made to such embodiments without departing from the spirit and scope of the invention. For example, those skilled in the art will appreciate that various means are available for varying the phase and polarization angle of two optical signals with respect to one another. For example, the relative phase of the two laser beams may alternatively be varied by varying the path length of one of the two beams. Also, various different means for detecting the intensity and phase of the return optical signals are contemplated. Thus, these and other modifications and additions may be obvious to those skilled in the art and may be implemented to adapt the present invention for use in a variety of different applications.

What is claimed is:

1. A fiber optic Fabry-Perot sensor for measuring absolute strain, said sensor comprising:
   a) a polarization maintaining first optical fiber having a distal end;
   b) a second optical fiber positioned so as to form an etalon in cooperation with the distal end of the first optical fiber; and
   c) a combined beam transmitted through the first optical fiber and reflected by the second optical fiber, the combined beam having:
      i) a first laser beam; and
      ii) a second laser beam orthogonally polarized to the first beam and in quadrature to the first beam
   d) wherein the polarization maintaining first optical fiber facilitates the use of the first and second orthogonally polarized laser beams in quadrature so as to provide absolute strain measurement.

2. The fiber optic Fabry-Perot sensor as recited in claim 1, wherein said polarization maintaining first optical fiber comprises a single mode fiber.

3. The fiber optic Fabry-Perot sensor as recited in claim 1, wherein said second optical fiber comprises a multi-mode optical fiber.

4. The fiber optic Fabry-Perot sensor as recited in claim 1 further comprising a mirrored surface formed upon said second optical fiber to form the etalon.

* * * * *